United States Patent Office
2,883,293
Patented Apr. 21, 1959

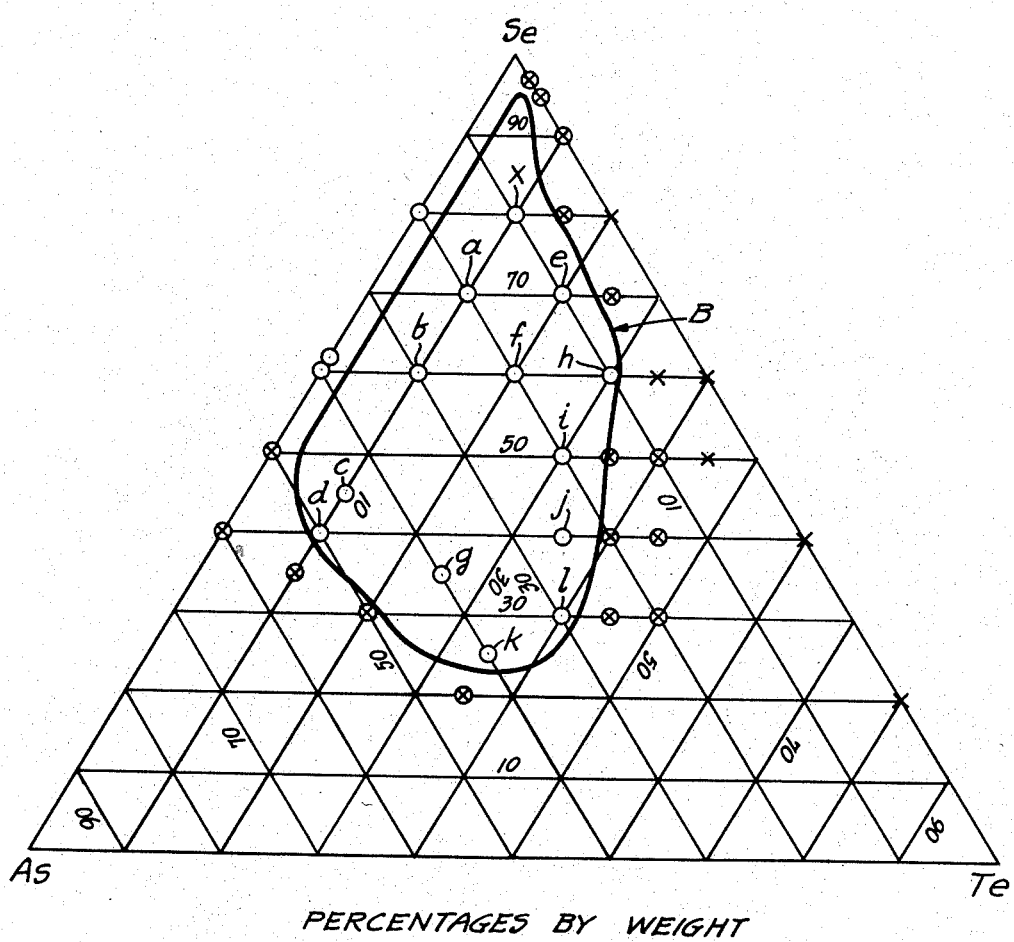

2,883,293

GLASS COMPOSITION

Joseph Jerger, Jr., Hempstead, N.Y., and John F. McKenna, Livingston, N.J., assignors to Servo Corporation of America, New Hyde Park, N.Y., a corporation of New York Application June 11, 1957, Serial No. 664,983

3 Claims. (Cl. 106—47)

This invention relates to glasses produced from ternary mixtures of the elements arsenic, selenium and tellurium.

This application is a continuation-in-part of copending application U.S. Serial No. 465,928, filed November 1, 1954, and now abandoned.

In the indicated glass field, arsenic trisulfide has been known to produce homogeneous glasses. These glasses are characterized by transmission properties selective to the infrared spectrum but are subject to certain limitations.

In copending application Serial No. 417,724, filed March 22, 1954, homogeneous glasses based on arsenic and selenium are disclosed to have certain desirable transmission properties. However, the transmission cut-off of these glasses does not extend as far into the infrared spectrum as is often desirable. For example, some of the arsenic-selenium glasses developed are limited in their transmission cut-off to a wave length of up to about 12.2 microns. "Transmission cut-off" as used herein is defined as the wave length at which the transmission through a 2 mm. thickness of the glass has decreased to 10% and past which the transmission does not again rise above 10%.

Insofar as the present application is concerned, infrared rays are divided into two wavelength categories: (1) near infrared which includes wavelengths ranging from the end of the visible spectrum, i.e. about 0.7 micron, up to about 2.5 microns, and (2) far infrared which ranges from about 2.5 up to about 25 microns.

In detecting devices such as infrared spectrometers, gas analyzers, radiation pyrometers, bolometers, etc., it is important that the optical glass employed be selective to infrared radiation. It is desirable that the infrared device operate selectively and flexibly over as wide a wavelength range as possible, e.g. 2.5 to 16 microns, preferably in the range of about 8 to 13 microns in applications involving a transmission of infrared energy from a source of radiation through the atmosphere to an infrared detector.

In copending application U.S. Serial No. 644,690, filed March 7, 1957, which is a continuation-in-part of Serial No. 372,540, filed August 5, 1953, and now abandoned, in the name of Walter A. Fraser, binary mixtures of $As_2Se_3$ and $As_2Te_3$ have been proposed and found to be desirably selective to infrared radiation, provided the binary mixtures are controlled over a narrow range of composition. However, under some situations, these glasses do not have the desired combination of transmission properties and, therefore, are limited in their use.

It is, accordingly, an object of the invention to provide a new field of glass compositions of the character indicated.

It is another object to provide improved infrared-transmitting glasses.

It is a further object to provide new glasses meeting the above objects and yet substantially opaque to visible light.

Another object is to provide a new field of glasses relying primarily on the use of elemental materials rather than on mixtures of compounds.

Still another object is to produce an improved infrared-transmitting glass of the character indicated and having a minimum proportion by weight of arsenic.

Other objects and various further features of novelty and invention will be pointed out or will occur to those skilled in the art from a reading of the following specification, in conjunction with the accompanying triaxial diagram. Said diagram depicts a field of glasses in which the substantial components are the elemental materials arsenic, selenium and tellurium.

Briefly stated, we have found a new field of glasses comprising the fused reaction products of various ternary mixtures of the elemental materials arsenic, selenium and tellurium. The amounts of elements present in the range do not correspond to binary mixtures of the compounds $As_2Se_3$ and $As_2Te_3$ and, therefore, are not as narrowly limited. Previous thinking with regard to glasses of the character indicated was based on the knowledge that arsenic triselenide and certain mixtures of arsenic triselenide with arsenic tritelluride were, of themselves, glassy and that desirable mixtures of these compounds could be produced, but we have discovered that desirable glasses may be formed in substantial regions not relying on the use of these compounds. The compositions provided by the invention are shown by referring to the accompanying triaxial diagram in which the left-hand corner represents 100 percent arsenic (As), the right-hand corner represents 100 percent tellurium (Te), and the upper corner represents 100 percent selenium (Se). Any point in the diagram represents a definite composition; for example, point X represents a composition containing 10 percent arsenic, 80% selenium and 10% tellurium.

The solid line B in the diagram (developed empirically) delineates the ternary compositions provided by the invention which will definitely form glasses, as distinguished from those which become crystalline. Close to this border, we have plotted certain specific compositions which have been made. Those points inside the area defined by line B represent glasses and are each identified by a small circle (o). Good glasses will form from compositions anywhere in this area. Except for a portion along the As—Se base line, points outside the area and designated by a cross (x) represent purely crystalline compositions, and other points in the said remaining area are designated by a cross in a circle (x) and represent generally glassy materials with some crystalline content.

The diagram thus shows that compositions along the base line between arsenic and selenium are glassy, as long as the percentage by weight of arsenic is less than substantially 50 percent. As has been stated hereinbefore, these glasses are limited in their transmission cut-off. However, when more than about 2% tellurium is added to replace part of the selenium, the proportion by weight of selenium may be reduced to as low a figure as substantially 23 percent, without devitrification of the melt.

Examples of good glasses indicated in the area enclosed by the solid line B are as follows:

| Designation | Percent As | Percent Se | Percent Te |
|---|---|---|---|
| x | 10 | 80 | 10 |
| a | 20 | 70 | 10 |
| b | 30 | 60 | 10 |
| c | 45 | 45 | 10 |
| d | 50 | 40 | 10 |
| e | 10 | 70 | 20 |
| f | 20 | 60 | 20 |
| g | 40 | 35 | 25 |
| h | 10 | 60 | 30 |
| i | 20 | 50 | 30 |
| j | 25 | 40 | 35 |
| k | 40 | 25 | 35 |
| l | 30 | 30 | 40 |

By adding tellurium to the arsenic-selenium compositions, an improved combination of transmission properties is assured and makes available a whole new group of compositions having a wider range of selenium content, as well as extending the range of the other elements. Thus, according to the diagram, selenium is made to range by weight from about 23% to 95%, tellurium from about 2% to 42%, and arsenic from about 2%, and more preferably from about 8% to 52%, the percentages of these elements forming the ternary compositions being such as to exclude compositions corresponding stoichiometrically to mixtures of the compounds $As_2Se_3$ and $As_2Te_3$ disclosed in copending application Serial No. 644,690.

In producing the glass compositions provided by the invention, the following procedure is employed:

A glass composition corresponding to about 20% As, 70% Se, and 10% Te (designated as composition "a" in the table above) is prepared by weighing out a total of 500 grams of the elements of substantially high purity in the comminuted or granulated form. The elements are proportioned in accordance with the composition desired, and are mixed and placed in a "Pyrex" glass container (about 2 inches in diameter) provided with a "Pyrex" glass cover adapted to enable a stirring rod to pass through the cover into the container and to enable the provision of an inert atmosphere of nitrogen, argon, etc.

The container is placed in a resistance-wound vertical furnace and heated so that the temperature is raised to 250° C. as fast as possible and held there so as to melt the selenium. At this point the mass is stirred in order to maintain a uniform mixture between the liquid selenium and the solid arsenic and tellurium and to facilitate a smooth reaction. Upon completion of stirring, the mass is further heated at a maximum rate to 460° C. and the mixture stirred again. At this point tellurium is molten. Above 460° C. arsenic gradually reacts with the molten selenium and tellurium. The temperature is then raised to 500° C. and the melt stirred again until all of the arsenic has reacted, the stirring being continued for about an hour at this temperature.

The molten bath, which weighs about 500 grams, is then cooled down to about 450° C. at a rate of about 8° C. to 10° C. per hour while stirring at a continuously decreasing rate to prevent striae, and the stirrer is then removed. The melt is then cooled to 300° C. over a 24 hour period, this rate of cooling being important to prevent striae. At the end of this period, the composition is cooled from 300° C. to 185° C. in 4 hours.

After the temperature has reached 185° C., the composition is subjected to an annealing step comprising cooling it slowly to 155° C. over a 24 hour period. The power of the furnace is turned off and the composition finally furnace-cooled to room temperature.

The glass product obtained from the "Pyrex" glass container is about 4 inches long and 2 inches in diameter. In subjecting the glass to a transmission test, a disc of about one quarter inch thick is first obtained from near the center of the cylindrical product by cutting with a diamond wheel. The slice is ground to a thickness of about 2 mm. and polished in an essentially conventional manner.

The resulting test sample is then mounted in a sample holder and put into the sample beam of a Baird double-beam recording infrared spectrophotometer (manufactured by the Baird Atomic Co. of Cambridge, Mass.). The instrument is operated to record the transmission characteristics of infrared radiation ranging from about 2 to 16 microns in wavelength. The results showed that this glass (20% As, 70% Se, and 10% Te) indicated a cut-off at a wavelength of about 13.5 microns. Binary compositions of arsenic and selenium, e.g. 20% As, 80% Se, and 40% As, 60% Se, exhibited cut-off values of about 12.2 microns, thus showing by comparison the improved properties which are obtainable with some of the ternary mixtures.

It will be apparent from the foregoing glass compositions that tellurium is important as a third element in completing the ternary composition. For high transmission properties it is desirable to use more than the 2% minimum tellurium stated hereinbefore. One preferred composition is one comprising about 8% to 33% arsenic, about 34% to 85% selenium, and about 5% to 38% tellurium. It will be noted that glass composition "a" which gave a fairly high cut-off value falls within the foregoing preferred composition range. Another preferred composition is one comprising about 38% to 50% As, about 23% to 53% Se, and about 5% to 38% tellurium.

While the invention is concerned substantially with the ternary compositions disclosed and claimed herein, it will be appreciated that small amounts of other ingredients may be tolerated in the ternary composition without adversely affecting substantially the transmission properties of the glass provided by the invention.

It will be seen that we have described improved glass compositions and have delineated a new field of glasses. Our glasses have good infrared-transmitting properties and provide certain security in the visual range by virtue of their substantial opacity to visible light.

While we have described the invention in detail with particular reference to certain glasses, it will be appreciated that the invention is of broader scope and is defined in the claims which follow.

We claim:

1. An optical, infrared-transmitting glass composition comprising essentially a fused, vitreous, non-crystalline mixture of arsenic, selenium and tellurium in percentages by weight defined by the area enclosed within solid line B of the triaxial diagram, the percentages by weight of the elements being nonstoichiometric with respect to mixtures corresponding in composition to $As_2Te_3$ and $As_2Se_3$.

2. An optical infrared-transmitting glass composition comprising essentially a fused, vitreous, non-crystalline mixture of about 8% to 33% As, about 34% to 85% selenium, and about 5% to 38% tellurium.

3. An optical, infrared-transmitting glass composition comprising essentially a fused, vitreous, non-crystalline mixture of about 38% to 50% As, about 23% to 53% Se, and about 5% to 38% tellurium.

References Cited in the file of this patent

The Glass Industry, September 1935, page 285.
Pelabon: Ann. Chem. Phys., Chem. Abst. 17, 526–566, 1910, vol. 4, pages 10–11, 1910.